FIRE EXPLOSIVE TOOLS

Original Filed July 19, 1968 2 Sheets-Sheet 1

*Inventors*
*Albert E. Newton*
*Paul G. Rumball*
*By their Attorney*
*Carl E. Johnson*

FIRE EXPLOSIVE TOOLS

Original Filed July 19, 1968 2 Sheets-Sheet 2

United States Patent Office

Re. 27,628
Reissued May 1, 1973

27,628
FIRE EXPLOSIVE TOOLS

Albert E. Newton and Paul C. Rumball, Beverly, Mass., assignors to USM Corporation, Flemington, N.J., and Boston, Mass.

Original No. 3,554,424, dated Jan. 12, 1971, Ser. No. 746,220, July 19, 1968. Application for reissue Nov. 1, 1971, Ser. No. 190,461
Int. Cl. B25c *1/14*
U.S. Cl. 227—8 13 Claims

Matter enclosed in heavy brackets [ ] appears in the original patent but forms no part of this reissue specification; matter printed in italics indicates the additions made by reissue.

ABSTRACT OF THE DISCLOSURE

An explosively actuated device for driving pins and studs, for instance, by using only one hand. Compact and simple in structure, the tool preferably employs an impact-ignitable primerless charge for generating gas pressure, a simple means for advancing successive charges from a supply source on the tool into firing position, and safety features preventing premature ignition. The loaded tool may be manually pushed against the locality of a work piece which is to receive a fastener in order to initiate the explosion resulting in the fastener driving.

CROSS REFERENCE TO RELATED CASES

The method of ignition practiced in the embodiment of this invention is disclosed in U.S. Letters Patent No. 3,283,657, issued Nov. 8, 1966, and the explosive charge herein illustrated as being employed is disclosed in U.S. Letters Patent No. 3,372,643, issued Mar. 12, 1968, both filed in the name of Robert C. Kvavle and assigned to the present assignee. A trigger-released tool utilizing the method and charge referred to is disclosed in U.S. Letters Patent No. 3,330,108, issued July 11, 1967 in the name of Robert C. Kvavle, et al.

BACKGROUND OF THE INVENTION

This invention relates to the provision of an improved low cost explosively operated construction tool, especially for delivering a driving or forming blow. It is particularly concerned with providing an economical and reliable one-hand operbale tool of this type which is especially useful in applying considerable impact force for driving studs or nails into hard materials even in working areas which are restricted or have limited access.

Explosive driving devices currently are available which require an operator to hold them against a work piece with one hand while he swings a hammer with the other hand to strike a tool head, thus percussively causing a primer to effect explosion of a cartridge. An example of this general type of tool, but as revised to employ primerless charges, is disclosed for instance in U.S. Letters Patent No. 3,395,843, issued on Aug. 6, 1968, on an application in the name of Robert C. Kvavle. It is often found to be a nuisance to have to be concerned with the ejection of spent cartridges, to have to reload separate charges manually, and to have to utilize explosive devices requiring complex cocking mechanism or to swing a firing hammer when there is no sufficiently clear working space. The present invention accordingly aims to overcome these handicaps while providing a safe, simple and economical tool especially for on-the-job construction purposes.

SUMMARY OF THE INVENTION

As herein shown the invention is embodied in a tool comprising a push or hammer-to-fire operating cap carrying a firing pin, a transversely slotted barrel telescoping in the cap, a vented anvil-feed slide in the barrel slot for carrying a primerless charge into operative relation to the firing pin, and a fastener driving piston axially slidable in the bore of the barrel to and from operative relation with the feed slide. The illustrative combination further includes, mounted on one end of the barrel, a work-engageable guide for an end of the piston and a fastener to be driven thereby, relative axial movement of the operating cap and the barrel causing the firing pin to explode the charge fed in said slide and thereby urge the piston to drive the fastener into a work piece. The mass of the cap may, in effect, serve as its own ignition hammer. Preferably, and as illustrated herein, a finger-retractable safety is normally interposed between the cap and an end of the barrel positively to prevent ignition by spacing the impact end of the firing pin from the charge to be ignited in the feed slide until the moment operation is desired.

A further safety feature resides in the provision of novel mechanical means for positively preventing operation of the driving piston in a fastener inserting tool (or an equivalent punch or former) until its yieldably mounted nosepiece is relatively retracted with respect to the barrel by reason of endwise engagement with a work piece. To this end a pair of pivotally related safety levers spring-urged into closed or piston-abutting relation are swung apart to allow piston operation only in response to the levers being cammed open by an inner portion of the piston guide in the course of relative axial displacement of the nosepiece and the guide.

BRIEF DESCRIPTION OF THE DRAWINGS

The foregoing and other features of the invention together with various novel details in construction, including means for storing and feeding successive charges to be fired, will now be more particularly described in connection with an illustrative embodiment, and with reference to the accompanying drawings, in which.

DESCRIPTION OF THE PREFERRED EMBODIMENTS

Figure 1:
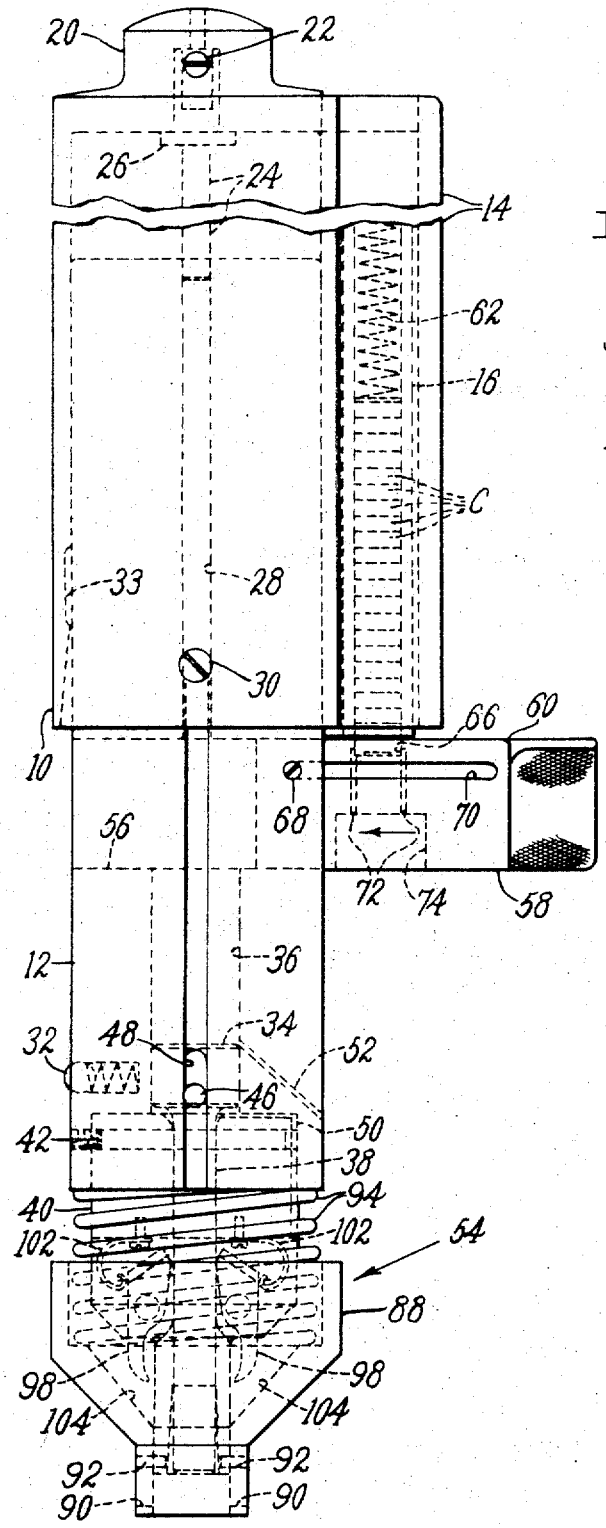
FIG. 1 is a view in elevation of a fastener driving tool powered by primerless charges to be successively fed in a slide, an operating cap being shown in retracted position on a barrel.

The illustrative tool comprises a hollow operating cap 10 (FIGS. 1–6) telescoped on a cylindrical barrel 12, the outer diameter of the cap preferably being of a dimension to be conveniently grasped by one hand. While in principle the tool can be designed for individual loading of explosive primerless charges C of the type abovementioned, the cap 10 desirably has formed thereon a tubular longitudinal portion 14 for slidably receiving a magazine tube 16 affixed to the barrel 12 by means of screws 18, 18 (FIG. 2) the bore of the tube accommodating a stack of the disk-like charges C to be successively fed and fired as will later be described.

Figure 2:
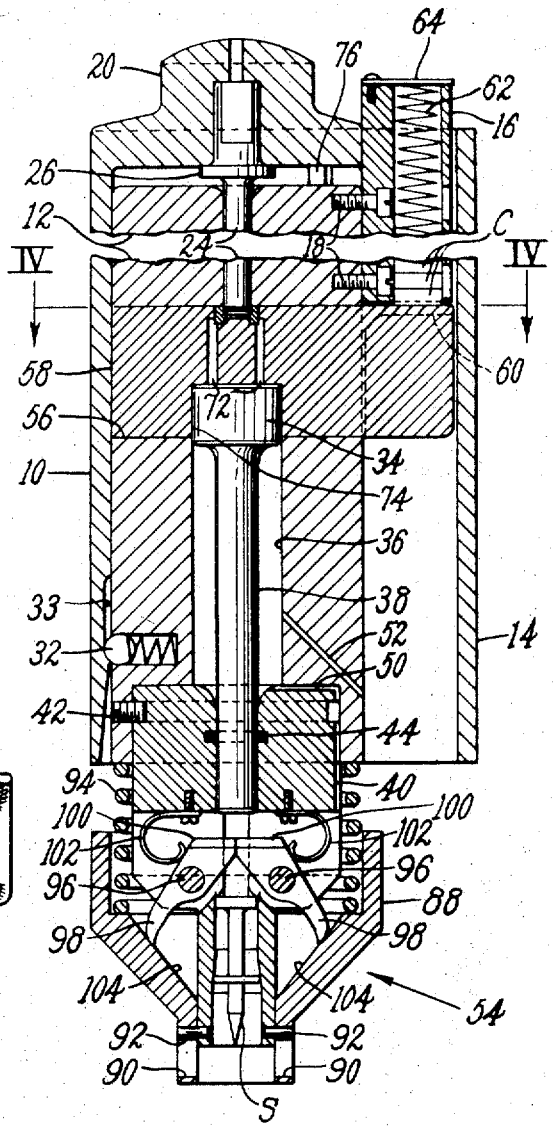
FIG. 2 is an axial section of the tool shown in FIG. 1, the parts now being advanced to ready-to-fire position, a fastener driving piston having been retracted and a charge and stud loaded.
Figure 3:
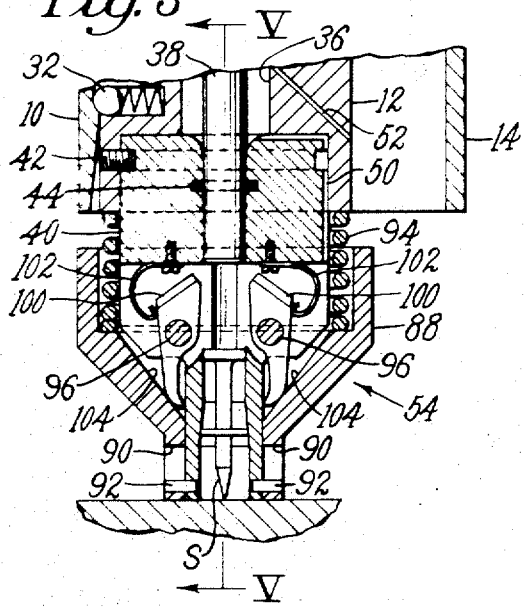
FIG. 3 is a section corresponding to the muzzle end of the tool shown in FIG. 2, the muzzle now engaging a work piece with pressure to open safety mechanism permitting operation of the piston.
Figure 4:
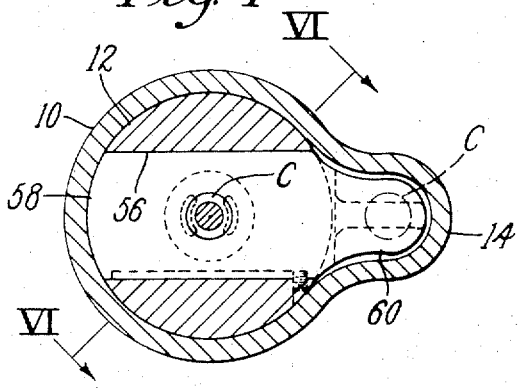
FIG. 4 is a transverse section taken on the line IV—IV of FIG. 2.
Figure 5:
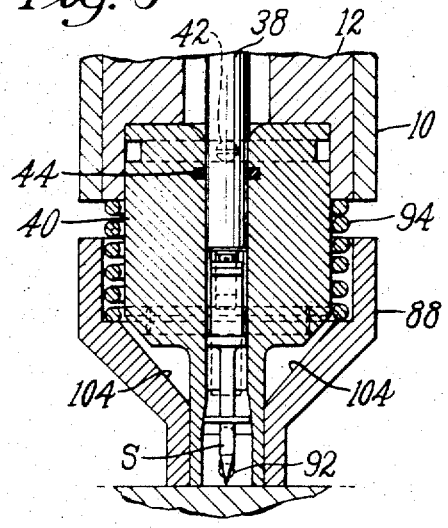
FIG. 5 is a view corresponding to FIG. 3, the tool being turned 90° about its longitudinal axis.

The cap 10 has axially secured to its head end 20 FIGS. 1 and 2) by means of a set screw 22 a firing pin 4 having a positioning flange 26 extending adjacent to ıe inner end of the cap. To prevent relative turning moveıent of the cap 10 and the barrel 12, most of one side f the latter is longitudinally slotted as at 28 (FIG. 1) ıd a set screw 30 threaded in the cap is arranged to ide in the slot 28. For retaining the cap 10 telescoped n the barrel in limited sliding assembly when the tool as been loaded for firing as will be explained, a ball lunger 32 (FIGS. 1 and 2) nested in the barrel yieldably rojects into a recess 33 formed in the side wall of the ıp.

A fastener driving piston 34 to be driven by the expandıg gases of combustion is slidable axially in a bore 36 f the barrel 12 and has a stem 38 which is received in a axial bore of a guide sleeve 40. The latter, hereinafter ırther referred to, serves as a stop for the piston 34, and secured in an end of the barrel by means of a set screw 2 (FIGS. 1–3 and 5). For frictionally holding the piston 4 in its upper or ready-to-fire position shown in FIGS. and 6, an O-ring 44 (FIGS. 2, 3 and 5) preferably is ated in the guide sleeve 40. In order to relieve pressure the barrel bore 36 ahead of the piston 34, a radial hole 6 (FIG. 1) and a longitudinal slot 48 in the barrel 12 omunicate with a bleeder passage 50 (FIGS. 2 and 3) ormed in the surface of the guide sleeve 40. An exhaust ort 52 (FIG. 1) may be provided in the barrel 12 to lieve spent combustion gases. A nose portion of the eeve 40 is internally tapered frictionally to receive and old a fastener to be driven, such as a stud S (FIGS. 3 and 5), and yieldably supports safety mechanism, enerally designated 54, later to be explained.

For successively advancing the charges C from the devery end of the tube 16 into position for firing by the ring pin 24, the barrel 12 is formed with a transverse ot 56 slidably to carry a finger-controlled combination ed slide-and-anvil 58. The member 58 is generally recngular in cross section, has a knurled finger grip end, ıd has its flat upper surface projecting to provide a trap oor or gate portion 60 underlying the stack of charges in the tube 16. In order to urge the stack toward the ıvil-feeder slide 58, a follower spring 62 extending in the ıbe 16 is backed by a pivotal cover 64 (FIG. 2) on the ıbe 16. An inner portion of the slide 58 is formed with circular firing chamber 66 adapted to receive the successive charges C when the slide is partly withdrawn from ıe barrel as shown in FIG. 1. A set screw 68 (FIG. 1) in ıe barrel 12 extends into a slot 70 in the slide 58 to limit s transverse motion between a charge pick-up position FIG. 1) wherein the chamber 66 is aligned with the magzine tube 16 and the firing position (FIG. 2) wherein ıe chamber 66 is in alignment with the striker end of ıe pin 24. With the charge C thus positioned, the safety ıp 10 may now be relatively telescoped from its position ıown in FIG. 1 to its position shown in FIG. 2, the unger 32 latching the assembly in ready to fire condition.

The charge C preferably is of a character such that cannot be exploded without being confined in a subantially closed chamber 66. To close its chamber 66 in ıis instance the pin 24 now has its striker end in close oximity to one side of the charge, and a pair of axial orts 72, 72 (FIG. 2) in the anvil portion of the slide 8 interconnect the firing chamber 66 with an enlarged ore 74 in the slide 58 adapted snugly to receive the ston 34. For thus positioning the piston endwise in the ide 58 a convenient probe may be safely used.

These preferably are two separate safety mechanisms ıcorporated in the tool as will next be described. The st acts to prevent drop-fire and is in the form of a pin 6 (FIGS. 2 and 6) slidable in a radial slot 78 in the ıp 10 adjacent to its inner end. The pin 76 is thicker ıan the firing pin flange 26 in order positively to prevent nition contact of the firing pin 24 with a charge C fed by the slide 58. One end of the pin 76 is connected to a finger operated lever 80 pivoted at 82 (FIG. 6) to the cap 10. A spring 84 having its ends respectively nested in the cap and an end of the lever 80 constantly urges the pin 76 into position to bar explosive operation of the tool.

The second safety mechanism, designated 54 as referred to above, makes it almost impossible for the tool to eject a fastener to injure anyone even if accidental firing occurs. For this purpose a cup-shaped nosepiece 88 (FIGS. 1–3, 5) is axially yieldable on the sleeve 40. Its smaller nose end is formed with opposed guide slots 90, 90 for slidably receiving aligned pins 92, 92 respectively secured in the sleeve 40. As shown in FIGS. 1 and 2, a compression spring 94 confined between an end of the barrel 12 and an internal shoulder of the nosepiece 88 urges them axially apart. Parallel pins 96, 96 fixed in the sleeve 40 pivotally support levers 98, 98, respectively, the hardened inner jaw ends 100 of which cooperatively serve, in the projecting nosepiece condition shown in FIG. 2, as an abutment blocking driving movement of the piston 34. Springs 102, 102, respectively, secured at one end to the sleeve 40 have their other ends urging the jaws closed. When the piston has been driven, as shown in FIG. 1, it holds the jaws open. Also, when the nosepiece 88 and the sleeve 40 are being pressed against a work piece W (FIGS. 3 and 5) intended to receive the loaded stud S the jaws are opened. This is because the nosepiece 88 is retracted relatively to the sleeve 40 and conical inner cam surfaces 104 of the nosepiece then engage rounded ends of the levers 98 to open the jaws 100 against resistance of the springs 102. Otherwise, the safety jaws remain closed.

Operation of the tool will now be briefly reviewed assuming a stack of charges C is in the magazine tube 16 and that one has just been fired. The cap 10 is first retracted on the barrel 12 from the "down" position shown in FIG. 2 to the "up" position shown in FIG. 1 to enable the slide 58 to be shifted laterally by its finger grip portion from its delivery or firing position indicated in FIG. 2 to its reloading position shown in FIG. 1. In this latter position, determined by the screw 68, the trap door or gate portion 60 of the slide now permits the endmost charge C in the stack to be spring-urged into the firing chamber 66 whereupon the loaded slide 58 is returned to its firing position. The remaining charges in the magazine are retained therein by the slide portion 60. Now the cap 10 is telescoped to its "down" position to carry the firing pin 24 close to the charge C next to be ignited, the plunger 32 clicking into its recess 33, and the drop-fire pin 76 preventing engagement of the firing pin with the delivered charge.

Figure 6:
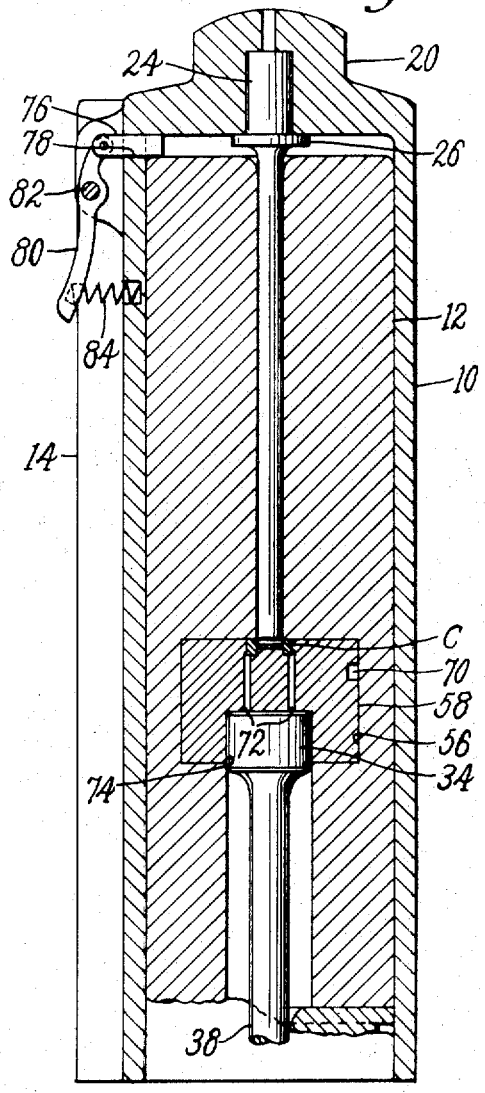
FIG. 6 is an axial section taken on the line VI—VI of FIG. 4.

At this stage the operator may use some convenient probe to move the piston stem 38 axially from its driven position (FIG. 1) to its upper or initial operating position (FIG. 2) in the slide bore 74. As soon as the stem moves inwardly beyond the safety jaws 100, they tend to snap closed, fully closing upon probe removal to bar tool operation even if the loaded charge be accidentally ignited. Even in the very unlikely circumstance that the tool would be dropped nose-down while the probe is still extending between the jaws 100, the probe thus moving the piston 34 rearwardly against the anvil portion of the slide 58, the probe could not act through the piston to force the firing pin against the charge and thereby accidentally effect ignition. The reason for this is that the slide 58, as best shown in FIG. 6, is not rearwardly displaceable relative to its transverse guide slot 56, and the barrel 12 is itself prevented from moving rearwardly by the pin 76. With the stud to be driven inserted in the sleeve 40 the nosepiece 88 must be pressed against the locality of the work piece W which is to receive the stud before the jaws 100 will reopen for fastener driving by means of the piston 34. If now ready to ignite the charge the operator depresses the safety lever 80 to clear the pin 76 from barring operation of the firing pin 24. The operator may either effect explosion of the charge by pushing the cap 10 with one hand toward the work piece relatively to the barrel 12 or he may, if desired, strike the head end 20 of the cap 10 with a hammer blow while guiding the tool with his other hand.

From the foregoing it will be apparent that the invention affords an economical, trouble-free tool. The firing pin impact of the charge C as it is substantially confined in its anvil chamber 66 produces very little recoil on the cap 10, the gases of combustion being directed through the ports 72 to drive the piston 34 and hence the stud S into the work. It will be apparent that with slight modification the tool may be adapted for generating and directing fluid pressure, for installing other fasteners, for punching holes, or otherwise forming hard materials. In each instance the one-hand push-to-fire capability offers particular advantage in restricted working space, and the ease of reloading plus inherent safety in operation assure good performance rates.

Having thus described our invention, what we claim as new and desire to secure by Letters Patent of the United States is:

1. An explosive tool comprising an operating cap carrying a firing pin, a transversely slotted barrel telescoped in the cap, an anvil feed slide having a firing chamber and movable in the barrel slot for carrying a charge into operative relation to the firing pin, and a fastener driving piston axially slidable in the bore of the barrel and to and from a position in communication with the firing chamber when the anvil feed slide is in operative relation to the firing pin.

2. A tool as set forth in claim 1 wherein there is a magazine secured to the barrel for carrying a spring-pressed stack of charges for successive delivery into the firing chamber of said anvil feed slide.

3. An explosive tool comprising a cylindrical operating cap closed at one end, a firing pin secured to and projecting axially from said end, a tubular barrel axially telescoped in the cap and having two spaced coaxial bores, one of said bores being adapted slidably to receive a portion of the firing pin and the other barrel bore being adapted slidably to receive a fastener driving piston, and feed means including a firing chamber operable transversely of the barrel when the cap is relatively retracted to position and support a charge for ignition intermediate the firing pin and the piston, said firing chamber having communication with the piston upon ignition of said charge.

4. A tool as set forth in claim 3 wherein the cap is formed with an eccentric longitudinal bore, and the barrel carries a magazine tube slidable in said eccentric bore, the arrangement being such that in one position the feed means has its firing chamber aligned for receiving a charge from the tube and in all other positions a gate surface of the feed means retains the charges in the tube.

5. A tool as set forth in claim 3 wherein said feed means is in the form of a slide adapted to be moved transversely of the barrel, and means is provided for limiting slide travel to position the firing chamber between a charge pick-up position and a charge ignition position.

6. A tool as set forth in claim 3 wherein the feed means is in the form of an anvil slide having its firing chamber recessed in one side thereof, an opposite side of the slide being formed with a recess to receive the piston, and vents axially connect the slide firing chamber with said piston recess.

7. A tool as set forth in claim 3 wherein, when said feed means supports a charge for ignition by the firing pin, a detent means operative between the cap and the barrel is arranged to position an impacting end of the firing pin in the feed means closely adjacent to the charge.

8. An explosive tool comprising a relatively reciprocable tubular barrel and an external operating member carrying a firing pin, the barrel having an axial bore for slidably guiding a fastener driving piston and a transverse guideway extending between the pin and the piston, a sliding anvil movable in the guideway and providing a vented firing chamber for confining a primerless charge in position to be impacted by the firing pin, and a sleeve secured to an end of the barrel for holding a fastener to be driven and for guiding the stem of said piston during fastener driving.

9. A tool as set forth in claim 8 wherein the sleeve is fitted with friction means for retaining the piston in vent closing relation to the firing chamber when the anvil confines the charge to be impacted.

10. In an explosive tool having a tubular barrel, relatively movable firing means for igniting a charge therein, and a piston axially slidable in the bore of the barrel for driving a fastener in response to the explosion of said charge, safety means mounted on the barrel for barring premature operation of the piston, said safety means comprising a sleeve for guiding the piston and the fastener to be driven thereby, a nosepiece yieldingly retractable on the sleeve when urged into engagement with a work piece intended to receive the fastener, and abutment means movably mounted in the sleeve and normally arranged to prevent fastener driving movement of the piston, said abutment means being yieldingly shiftable in response to relative movement of the sleeve and the nosepiece to permit operation of the piston.

11. A tool as set forth in claim 10 wherein said abutment means includes a pair of jaws pivotally supported in the sleeve and biased to block the operating path of the piston, the jaws being arranged respectively to be cammed to open position by engagement therewith of the nosepiece during its relative retraction.

12. In a manually controlled device for generating fluid pressure to be directed by a tubular barrel, an operating member relatively movable on one end of the barrel to actuate a firing pin axially in the bore of said barrel, a feeding anvil reciprocably movable transversely of the barrel bore, said anvil having a firing chamber recessed in one surface to receive a primerless explosive charge externally of the barrel and then support the charge within the bore for impact ignition by said pin, said anvil having a vent extending from the firing recess in said surface to an opposite anvil surface, and means limiting the anvil movement in one direction to align the firing chamber with said pin and the anvil vent with said barrel bore.

*13. An explosive tool comprising a barrel means, a firing pin mounted for axial movement in the barrel means, a housing means coaxially associated with the barrel means, one of the housing means and the barrel means having a transverse opening formed therein, a feed member having a cartridge receiving chamber and movable in said opening to carry a charge into operative relation to the firing pin, and fastener driving piston means axially slidable in the bore of the barrel means and to and from a position in communication with the cartridge in said chamber when the feed member is in operative relation to the firing pin.*

References Cited

The following references, cited by the Examiner, are of record in the patented file of this patent or the original patent.

UNITED STATES PATENTS

| | | | |
|---|---|---|---|
| 1,365,869 | 1/1921 | Temple | 237—9 |
| 2,533,851 | 12/1950 | Temple | 227—9 |
| 3,395,843 | 8/1968 | Kvavle | 227—10 |

GRANVILLE Y. CUSTER, JR., Primary Examiner

U.S. Cl. X.R.

227—10